United States Patent [19]

Komori

[11] Patent Number: 4,473,140
[45] Date of Patent: Sep. 25, 1984

[54] FRICTION PAD ASSEMBLY

[75] Inventor: Fukutaro Komori, Tokyo, Japan

[73] Assignee: Komori Seisakusho Co., Ltd., Japan

[21] Appl. No.: 99,035

[22] Filed: Nov. 30, 1979

Related U.S. Application Data

[60] Division of Ser. No. 929,969, Aug. 1, 1978, abandoned, which is a continuation of Ser. No. 792,261, Apr. 29, 1977, abandoned.

[30] Foreign Application Priority Data

May 4, 1976 [JP] Japan ............................. 51-56297

[51] Int. Cl.³ ............................................. F16D 69/00
[52] U.S. Cl. ................................ 188/250 G; 188/234
[58] Field of Search ................... 188/234, 236, 251 R, 188/251 A, 251 M, 250 G

[56] References Cited

U.S. PATENT DOCUMENTS

| | | | |
|---|---|---|---|
| 1,954,521 | 4/1934 | Cunningham | 188/234 |
| 2,381,941 | 8/1945 | Wellman et al. | 188/234 |
| 2,438,483 | 3/1948 | Tack | 188/234 |
| 3,297,117 | 1/1967 | Freholm | 188/234 |

FOREIGN PATENT DOCUMENTS

| | | | |
|---|---|---|---|
| 1294145 | 4/1962 | France. | |
| 1394819 | 2/1964 | France. | |
| 1500824 | 10/1967 | France. | |
| 569951 | 11/1957 | Italy | 198/234 |
| 356420 | 4/1960 | Japan. | |
| 3513297 | 6/1960 | Japan. | |
| 4713807 | 1/1967 | Japan. | |
| 141954 | 11/1930 | Switzerland. | |
| 1238616 | 7/1971 | United Kingdom. | |

Primary Examiner—Joseph E. Valenza
Attorney, Agent, or Firm—Bacon & Thomas

[57] ABSTRACT

A rivet- or bolt-type fastening member for fastening an asbestos base friction material for use in vehicles to a supporting member, wherein the fastening member is provided with a mass of sintered metal friction material fixed to the top surface of the head of fastening member and thereby adapted to have a frictional effect.

5 Claims, 6 Drawing Figures

FRICTION PAD ASSEMBLY

This application is a Division of Serial No. 929,969, filed August 1, 1978, now abandoned, and which in turn was a continuation of Serial No. 792,261, filed April 29, 1977 and now abandoned.

BACKGROUND OF THE INVENTION

This invention relates to fastening members and, more particularly, to fastening members adapted to have a frictional effect and suited to fasten an asbestos base friction material for use in vehicles, such as brake lining or clutch facing, to a supporting member.

Owing to the traffic congestion resulting from the marked increase of vehicles in recent years, the frequency of use of the brake or clutch and the load applied thereto have become extremely higher. In addition, the chances of stopping or starting the car and going slow still continue to increase because of the installation of more traffic signals and the addition of "Stop" or "Go Slow" signs for the purpose of preventing traffic accidents.

Accordingly, the wear of the asbestos base friction materials constituting the brake lining or the clutch facing tends to proceed at increasing rates. Replacement of these friction materials involves disassembly and assembly operations which require many man-hours and great expenses. It is also disadvantageous that the vehicle cannot be used during such operations. Furthermore, in the case of brake linings, application of the brake often produces a noise or friction sound as is usual with the prior art.

SUMMARY OF THE INVENTION

It is therefore an object of this invention to provide a fastening member which will overcome the above-described shortcomings of the prior art, can readily fasten a friction material to a supporting member, and will allow the friction material to undergo less wear and hence stand long-term use.

In accordance with this invention, there is provided a rivet- or bolt-type fastening member comprising a head and a shank, characterized in that said fastening member is provided with a mass of sintered metal friction material fixed to the top surface of said head and thereby adapted to give a frictional effect to a friction material.

When a present asbestos base friction material for use in vehicles, such as brake lining or clutch facing, is fastened to a supporting member by means of fastening members of this invention and the friction surfaces, or the top surfaces of both the friction material and the masses of sintered metal friction material, are brought into sliding contact with the mating member, the surface of the friction material becomes coated with wear debris of sintered metal friction material having good wear resistance. Thus, the friction material such as brake lining or clutch facing is allowed to stand long-term use.

BRIEF DESCRIPTION OF THE DRAWING

The present invention will be better understood from the following description of preferred embodiments thereof taken in connection with the accompanying drawings in which.

DETAILED DESCRIPTION OF THE PREFERRED EMBODIMENTS

Figure 1:
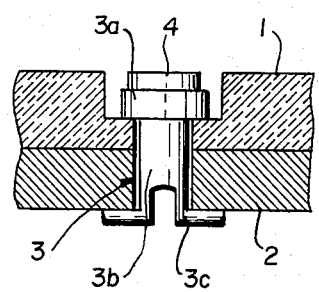
FIGS. 1 and 2 are partially sectional, side-elevational views showing the fastening of a friction material to a supporting member by means of fastening members in accordance with two embodiments of this invention.

Referring first to FIG. 1, a friction material 1 is fastened to a supporting member 2 by means of a fastening member 3 in accordance with this invention. In this figure, the fastening member 3 is of the rivet-type. Its head 3a which resembles the ordinary rivet head has a mass 4 of sintered metal friction material fixed thereto, the outside diameter of the mass 4 being smaller than that of the head 3a. In order to fasten the friction material 1 to the supporting member 2, a hole having an inside diameter slightly larger than the outside diameter of the shank 3b of fastening member 3 is bored through the supporting member 2, as shown in FIG. 1. On the other hand, a hole of the friction material 1 consisting of a lower portion having an inside diameter slightly larger than the outside diameter of the shank 3b and an upper portion having an inside diameter larger than the outside diameter of the head 3a is bored through the friction material 1. Then, the friction material 1 is laid on top of the supporting member 2 so that their holes are in alignment with each other. Thereafter, the shank 3b of fastening member 3 is inserted in the lower portion of the hole of the friction material 1 and in the hole of the supporting member 2. While pressure is being applied on that region of the top surface of the head 3a of fastening member 3 which is not covered with the mass 4 of sintered metal friction material (because the mass 4 is too brittle to apply pressure on its top surface), a blow is given to the hollow portion 3c formed at the lower end of the shank 3b. Consequently, the hollow portion 3c is expanded outward as shown in FIG. 1, whereby the friction material 1 is fastened to the supporting member 2. In the case of fastening members of the rivet-type, therefore, it is necessary for the lower end of the shank to be hollow over a length greater than the length of the portion to be expanded outward during the fastening operation.

Figure 2:
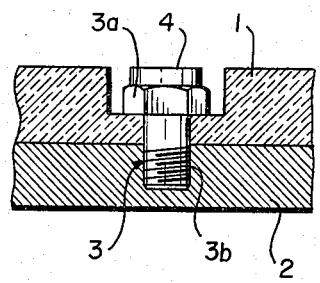

FIG. 2 illustrates a bolt-type fastening member 3 in accordance with another embodiment of this invention, which is used to fasten a friction material 1 to a supporting member 2. The head 3a of fastening member 3 has the same shape as the usual bolt and has a mass 4 of sintered metal friction material fixed to the top surface thereof. The shank 3b of this bolt-type fastening member 3 has a screw thread formed on the lower end thereof and the horizontal section of the head 3a is, for example, hexagonal. In order to fasten the friction material 1 to the supporting member 2, the friction material 1 having a hole as described in connection with FIG. 1 is laid on top of the supporting member 2 and the shank 3b of fastening member 3 is inserted in the lower portion of the hole of the friction material 1 until the tip of the shank 3b comes into contact with the surface of the supporting member 2. Then, the fastening member 3 is turned by means of a spanner fitted over the head 3a. Consequently, a part of the shank 3b is screwed in the supporting member 2 as shown in FIG. 2, whereby the friction material 1 is fastened to the supporting member 2. This bolt-type fastening member is suitable for use with a thick supporting member 2.

In FIGS. 1 and 2, the upper portion of the hole of the friction material 1 is desirably so adjusted that the top surface of the mass 4 of sintered metal friction material fixed to the head 3a of fastening member 3 is approximately 0.01 mm lower than the top surface of the friction material 1. The reason is that, when the friction surfaces or the top surfaces of the friction material 1 and the mass 4 are brought into sliding contact with the mating member such as brake drum, the top surface of the asbestos base friction material 1 first comes into sliding contact with the surface of the mating member and thereafter the top surface of the mass 4 of sintered metal friction material comes into sliding contact with the same surface, whereby attacks on the mating member such as brake drum can be alleviated.

Figure 3:
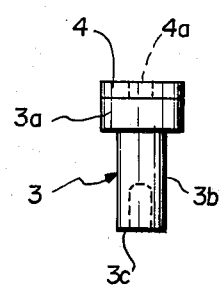
FIGS. 3 and 4 are side elevational views of fastening members in accordance with other embodiments of this invention.

FIG. 3 illustrates a fastening member 3 of the rivet-type in accordance with still another embodiment of this invention, in which the mass 4 of sintered metal friction material fixed to the head 3a of fastening member 3 has a vertical hole 4a bored through the central portion thereof.

In order to fasten a friction material to a supporting member, the fastening member 3 of FIG. 3 may be used in substantially the same manner as described in connection with FIG. 1. That is, while pressure is being applied on the top surface of the head 3a through the above-described hole 4a, a blow is given to the hollow portion 3c formed at the lower end of the shank 3b. Consequently, the hollow portion 3c is expanded outward as shown in FIG. 1.

Figure 4:
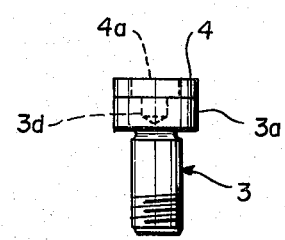
Figure 5:
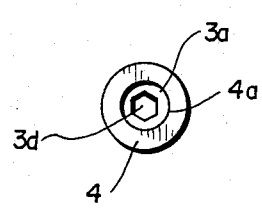
FIG. 5 is a plan view of the fastening member shown in FIG. 4.

FIGS. 4 and 5 illustrate a fastening member 3 of the hollow head bolt-type in accordance with still another embodiment of this invention, in which the mass 4 of sintered metal friction material fixed to the head 3a of fastening member 3 has a vertical hole 4a bored through the central portion thereof so that the inside diameter of the hole 4a is slightly larger than that of the hexagonal recess 3d formed in the head 3a. This fastening member is suitable for use in cases where the space between the head 3a of a bolt-type fastening member and the friction material 1 as shown in FIG. 2 is not sufficient to fit a spanner over the head 3a. That is, in substantially the same manner as described in connection with FIG. 2, the fastening member 3 is turned by means of a screwdriver fitted in the hexagonal recess 3d of the head 3a through the hole 4a of the mass 4. Consequently, the fastening member 3 is screwed in the supporting member, whereby the friction material is fastened to the supporting member.

Figure 6:
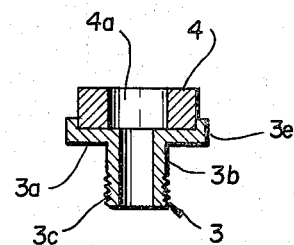
FIG. 6 is a vertical sectional view of a fastening member in accordance with still another embodiment of this invention.

FIG. 6 illustrates a fastening member of the flat cup head rivet-type in accordance with still another embodiment of this invention, in which an upward projecting peripheral flange 3e is formed so as to put the head 3a of fastening member 3 into the shape of a dish. In addition, the mass 4 of sintered metal friction material fixed to the head 3a has a hole 4a bored through its central portion so that the inside diameter of the hole 4a is larger than that of the hollow shank 3b. (If only the lower end of the shank is hollow as shown in FIGS. 1 and 3, this limitation on the inside diameter of the hole 4a may be eliminated.) In order to fasten a friction material to a supporting member, the fastening member 3 of FIG. 6 may be used in substantially the same manner as described in connection with FIG. 1. That is, while pressure is being applied on the top surface of the head 3a through the above-described hole 4a, a blow is given to the lower end 3c of the shank 3b. Consequently, the lower end 3c is expanded outward as shown in FIG. 1. When the fastening member shown in FIG. 6 is used, the mass 4 of sintered metal friction material will not be dislocated under the action of a lateral force applied on the top surface thereof. Thus, this fastening member has the advantage of being particularly stable to a lateral force.

Also in the fastening member of the hollow head bolt-type shown in FIGS. 4 and 5, the head may have an upward projecting peripheral flange as shown in FIG. 6.

In the fastening member of this invention, the shape of the head and the number of the shank are not necessarily limited by the accompanying drawings. That is, the fastening member may have a head of any desired shape and any desired number of shanks. (For example, it may be provided with two shanks.)

As described above, the fastening member in accordance with this invention has fixed to the head thereof a mass of sintered metal friction material which is highly resistant to wear as widely known in the field of clutch facing, so that it fulfills the wear resisting function as well as the fastening function. When the friction material, such as brake lining or clutch facing, fastened to the supporting member by means of fastening members in accordance with this invention is brought into sliding contact with the mating member, wear debris of sintered metal friction material will be formed under the action of friction. Consequently, the surface of the asbestos base friction material will be coated with such wear debris and thereby allowed to stand long-term use. In addition, no noises or friction sounds will be produced, as contrasted with the conventional brake lining.

Other features of the fastening member in accordance with this invention are that it is not only suited to fasten a friction material, such as brake lining or clutch facing, to a supporting member but also has a wide range of additional applications and that it can be manufactured at low cost because of its simple structure.

I claim:

1. A friction pad assembly comprising:
   a support shoe;
   a pad of nonmetallic friction material on one face of said shoe and having an exposed surface provided with a recess therein;
   a fastener holding said pad to said shoe and having an enlarged head in said recess; and
   a mass of sintered metal friction material, smaller than said head fixed to said head and having an outer surface generally aligned with said exposed surface, said mass of sintered metal friction material having a hole through the central portion thereof to expose said head and said head having a recess, adapted to receive a tool, with an inside diameter slightly smaller than the inside diameter of said hole.

2. An assembly as defined in claim 1 wherein said outer surface of said sintered metal material is slightly lower, in said recess, than said exposed surface.

3. An assembly as claimed in claim 1 wherein said head is in the shape of a rivet head and the lower end of said shank is hollow over a portion thereof and expanded outwardly of the other face of said shoe.

4. An assembly as claimed in claim 1 wherein said head is in the shape of a bolt head and said shank has a screw thread formed on the lower end thereof threadedly engaging said support shoe.

5. An assembly as claimed in claim 1 wherein said head has an upwardly projecting flange formed along the outer periphery thereof so that said head is in the shape of a dish.

* * * * *